United States Patent [19]

Forss

[11] 4,131,366
[45] Dec. 26, 1978

[54] DIRECTION INDICATING DEVICE

[76] Inventor: Magnus R. Forss, Eremitvägen 4, 183 50 Täby, Sweden

[21] Appl. No.: 759,214

[22] Filed: Jan. 13, 1977

[30] Foreign Application Priority Data

Jan. 27, 1976 [SE] Sweden ................................ 7600840

[51] Int. Cl.$^2$ ............................................. B64D 45/08
[52] U.S. Cl. .................................................... 356/140
[58] Field of Search ................. 356/140, 138; 350/276

[56] References Cited

U.S. PATENT DOCUMENTS

| 1,687,119 | 10/1928 | Benson et al. | 350/276 R |
| 3,031,351 | 4/1962 | McIlvaine | 350/276 R |
| 3,361,912 | 1/1968 | Lundberg | 350/276 R |
| 3,380,817 | 4/1968 | Gardner | 350/276 R |

FOREIGN PATENT DOCUMENTS

374601  6/1932  United Kingdom ................ 350/276 R

*Primary Examiner*—John K. Corbin
*Assistant Examiner*—R. A. Rosenberger

*Attorney, Agent, or Firm*—Pollock, Vande Sande & Priddy

[57] ABSTRACT

A device for indicating the direction to a remote object comprises at least one disc-like unit consisting of a plurality of elongated light guides, arranged in parallel, mechanically interconnected but optically insulated from each other. The end surfaces of the light guides located in one end surface of the unit face the object and their opposite end surfaces are facing the observer who sees a light area, or spot, composed by light passing through those guides which are right before his eyes. When the light spot is in level with his line of sight to the object the longitudinal axes of the light guides indicate the direction to the object. In a preferred embodiment two units are used one of which is rigidly mounted in a vehicle whereas the other one is pivotable around an axis perpendicular to the longitudinal axes and to the end surfaces of the light guides. The pivoting movement is controlled by one or more variables representative of the spatial situation of the vehicle.

2 Claims, 8 Drawing Figures

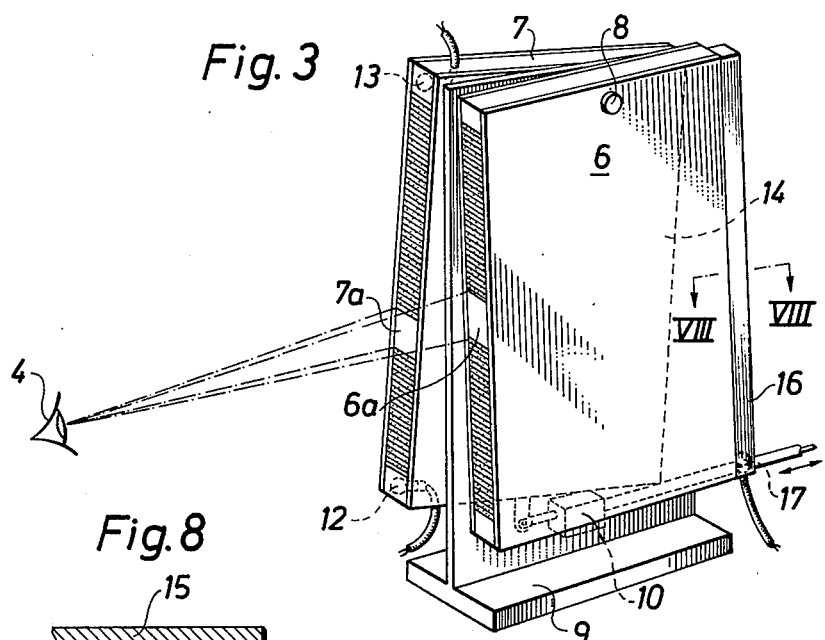
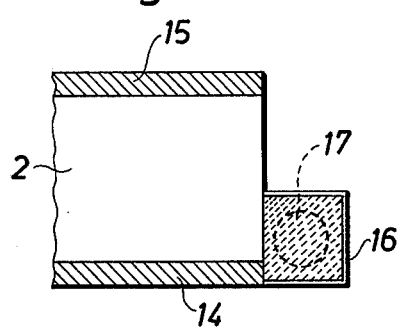
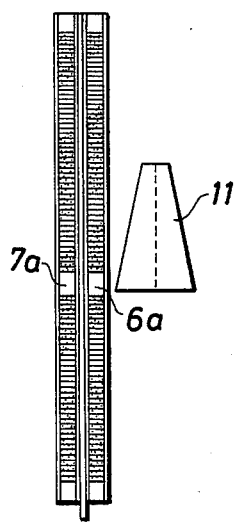
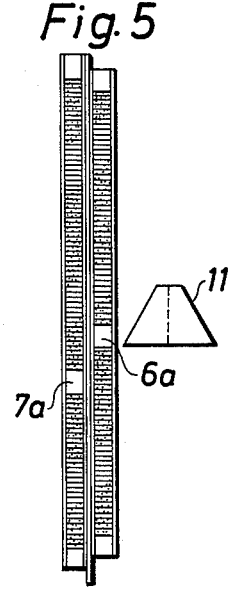
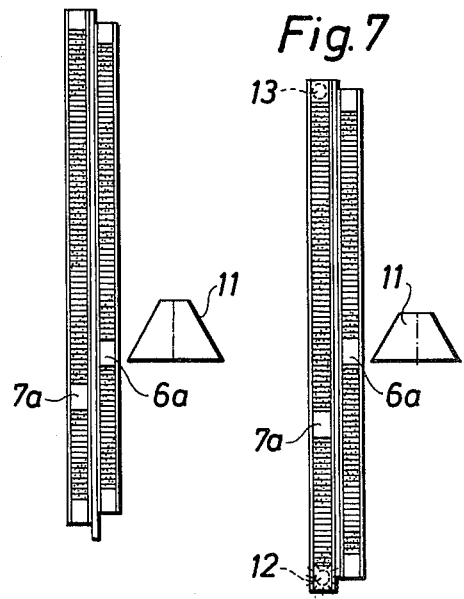

DIRECTION INDICATING DEVICE

The present invention relates to a device for indicating the direction to a remote object. The most important field of use of the invention is considered to involve the determination of directions from the driver's cabin or the like in vehicles. According to a corresponding embodiment of the invention the device is mounted in the cockpit of an aircraft and the direction indication supplies the pilot with information about a predetermined approach direction to a runway.

The most common type of devices for visual direction indication in aircraft are so-called head-up displays. With such display, an aiming image of the remote object, whose direction is to be determined, is projected on a disc obliquely mounted in front of the pilot. The disc is semi-reflecting so that the pilot can both observe a mirror image of the aiming image and look through the disc. The projection on the disc has an optical character that the pilot can, with full visual acuity, observe the relatively close image and at the same time have his eyes accomodated to infinity. In this way he has the possibility simultaneously to observe the remote object the direction which is to be determined. Such a device satisfies very high operational requirements but suffers from the disadvantage of being very expensive. A second drawback is that the eyes of the pilot must, within very narrow limits, maintain an unaltered position relative the disc. Changes from that relative position cause the image to disappear.

The object of the invention is to provide a direction indicating device in which the two disadvantages just discussed have been eliminated. In particular the manufacturing costs of the device should be relatively low and it shall not be necessary for the pilot to maintain his eyes in the same position relative to the device in order to receive the required information. The practical significance of the latter advantage is as follows. When the pilot of an aircraft is on final approach to a runway and accordingly is observing the reflected image frequently referred to, it happens that, due to turbulence in the lower air layers, it is very difficult for him to maintain his head in a constant position relative to the aircraft. As a result he will intermittently lose sight of the image. In this context it should be mentioned that the movements caused by air turbulence are primarily in the vertical plane of symmetry of the aircraft.

The above-mentioned object of the invention has, according to its main characteristic, been realized by means of a device comprising a plurality of light guides which are parallel to and optically insulated from each other. The longitudinal dimension of the guides is considerably greater than their cross-sectional dimensions, whereby light passing through the guides will be composed of substantially plane-parallel beams. The light guides are combined so as to form at least one disc-like unit in such a way that the end surfaces of the light guides are located in the end surfaces of the disc. One of those end surfaces is facing the object in question and the opposite end surface is facing an observer. The other sides of the suitably parallel-epipedic unit are insulated against external light. This means that when the last-mentioned end surface is observed the observer will see a limited light area formed by the end surfaces of those guides traversed by light reaching his eye. When that limited illuminated area is in level with the line of sight between the remote object and the observer's eyes, the direction to the object is determined by the angle between the longitudinal axes of the light guides and an arbitrary plane or line of reference.

A further object of the invention is to provide a device of the kind above specified yielding not only direction information but also information concerning the deviation of a given parameter from a nominal value. This will be explained in the detailed description below referring to an embodiment of the invention as applied to an aircraft approach visual aid.

FIG. 3 illustrates an embodiment of the invention comprising two disc-like units which are pivotable relative to each other.

FIGS. 4, 5, 6, and 7 illustrate the operation of a device according to FIG. 3 when used as an approach aid in an aircraft.

FIG. 8 is an enlarged sectional view taken along line VIII—VIII in FIG. 3.

Figure 1:
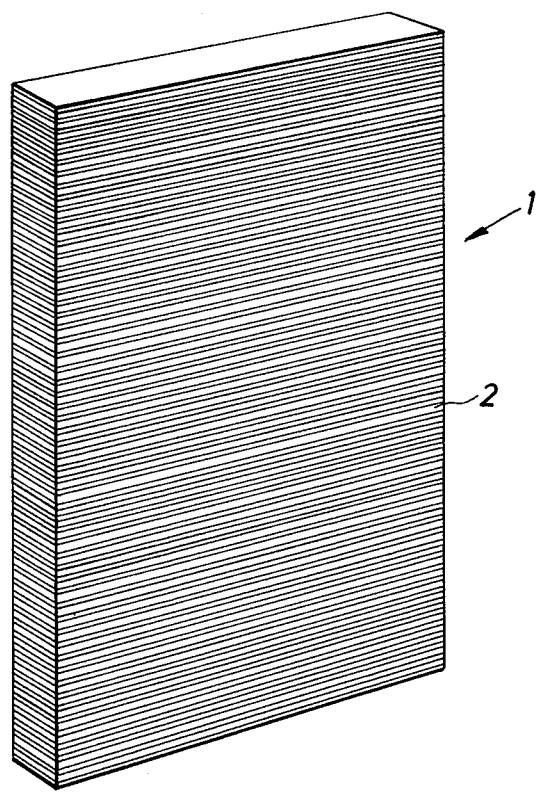
FIG. 1 shows diagrammatically the structural nature of the main portion of the device.

In FIG. 1 there is shown a disc-like unit 1 of parallel-epipedic shape. It consists of a package of a plurality of parallel light guides 2. As appears from the drawing, the longitudinal dimension of the guides is considerably greater than their cross-sectional dimensions, both height and width. The light guides are optically insulated from each other. According to the embodiment here illustrated that insulation is provided by extremely thin layers 3 of a light-insulating binding agent. Several types of such binding agents are commercially available, e.g. binding agents based on rubber.

Figure 2:
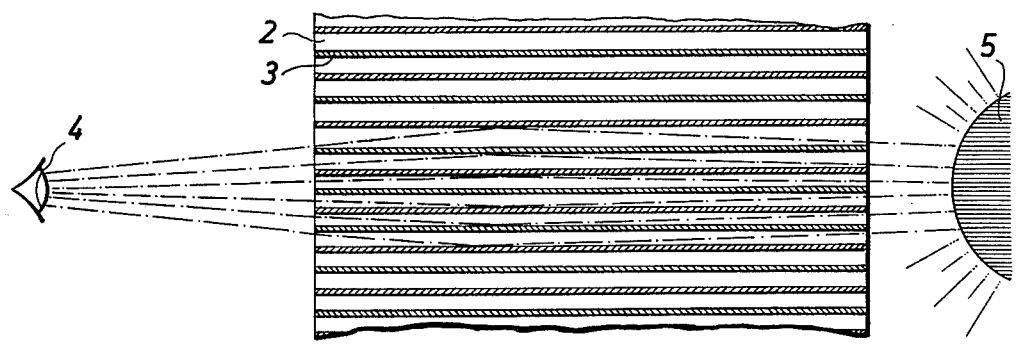
FIG. 2 is a fragmentary vertical section through the unit illustrated in FIG. 1 and illustrates the principle of opeation.

The result of the optical insulation above referred to in combination with the limited cross-section of the light guides in comparison with their length is that, for practical purposes, the light passing through any of the light guides may be considered to form a plane-parallel beam. This has been illustrated in FIG. 2 showing the eye 4 of an observer and a light source 5. The observer and the light source are at opposite sides of the device with reference to the light passage direction. An observer looking at the end surface of the disc facing his eyes will observe on that surface a limited light area. That area is composed of the end surfaces of those light guides which pass the light beams his eyes. It will be understood that the greater the distance between the device and the observer the greater will be the height of the light area observed.

It must be emphasized here that a light source 5 has been marked only to facilitate the understanding of the operation. A separate light source is required only when the illumination of the environment is insufficient to create an illuminated area which the observer can perceive. Such an embodiment will be described below with reference to FIG. 8. However, as a rule, daylight is sufficient as a light source. The main reason for this is the well-known fact that the human eye automatically adjusts itself to the existing external level of illumination. When daylight is weak the observer's eyes will correspondingly compensate for the reduction of light intensity in the zone under observation. Since the transmission losses occurring during the passage of the light through light guides 2 are negligible the illumination intensity of the observed light area can be considered the same as that of the background.

As the light beams passing through the guides 2 are not exactly plane-parallel the device does not, inherently, create a sharply defined illuminated area viewed by the observer. Instead, the top and the bottom of the illuminated area will comprise diffuse zones. This phenomenon can be counteracted OO by giving the top and bottom surfaces of the light guides a mat finish reducing reflection of oblique light rays. This treatment may involve a grinding operation making the surfaces irregular. Alternatively, if the light guides consist of glass, the treatment may consist of an etching process.

The fact that the light guides are traversed by plane-parallel beams makes it possible to determine the direction to the object. In that process the object is observed directly at the side of the light guide unit. When the illumination zone, or spot, is in level with the line of sight between the observer's eyes and the object, the line of sight is parallel to the longitudinal axes of the light guides. Accordingly, by relating the orientation of those axes to some suitable reference one can establish the direction to the object in relation to the same reference.

It should be noted that, as long as the eyes of the observer move within the height interval corresponding to the height of the light guide package, the observer will constantly see a light spot on the end surface of the disc. Since the distance to the object is great in comparison to the length of the light guides, the observer will all the time get the same direction information. The only difference is that the light spot is displaced vertically on the end surface of the disc, i.e. it accompanies the vertical level in which the observer's eyes are located. In the introduction to this specification the limitations of so-called head-up displays were painted out. This shows up when the relative position of the pilot's eyes and the equipment installed in the aircraft is changed, generally due to turbulence in the air. From what has just been said it can be concluded that the corresponding limitation is eliminated in a device according to the invention.

The arrangement shown in FIG. 3 comprises two disc-like units 6 and 7. Each of those discs has the general structure shown in FIG. 1. The two discs are pivotable in relation to each other in that disc 7 may turn around a pivot 8 perpendicular to the flat sides of the discs. Unit 6 is rigidly secured to a frame 9 secured to the aircraft in front of the pilot. Numeral 10 designates diagrammatically a suitable servo-unit for carrying out that pivoting movement. The observer's eye 4 sees a light spot 6a on the end surface of disc 6 facing him and a light spot 7a on the corresponding end surface of disc 7. The object whose direction is to be determined has not been shown on the drawing. However, it is presumed to be at a great distance from the observer. He observes the object directly by looking at the side of the apparatus. The operation of this apparatus comprising two discs is as follows.

It is first assumed that the pivot angle between discs 6 and 7 is zero, i.e. that the longitudinal axes of the light guides of both units are parallel to each other. The only difference as compared to FIG. 2 is in that case that the observer sees two light spots. These two spots will be in the same level.

It is then assumed that unit 7 has been rotated relative to unit 6 as shown in FIG. 3. As far as unit 6 is concerned there will be no change in the position of spot 6a. However, spot 7a will be displaced downwards. It is understood that the more unit 7 is rotated in relation to unit 6 the greater will be the vertical distance between spots 6a and 7a perceived by the observer. Naturally, if unit 7 is rotated in the opposite direction from its initial position, the observer will instead see spot 7a at a higher level than spot 6a. From what has been said above it should also be clear that if the eyes of the observer move upwards or downwards relative to the apparatus, both light spots will be correspondingly displaced. It is, however, important to realize that the displacement of the spots will occur at a preserved constant level difference. The practical significance of that fact will appear from the description below of FIGS. 4–7.

Accordingly, under the presumed conditions the longitudinal axes of the light guides in unit 6 will coincide with the direction to the observed object independently of the rotational position of unit 7. It is now assumed that the apparatus is rigidly installed on top of the instrument board of an aircraft in such a position that the longitudinal axes of the light guides in unit 6 coincide with the longitudinal axis of the aircraft. It follows therefrom that the pilot can make the aircraft fly towards a selected object or area on the ground by bringing light spot 6a in level with his line of sight to that object. Stated in other words, he can cause the aircraft to fly towards the object. If that object or area is the touchdown point of an airport runway he can cause his aircraft to fly along a given path towards that touch down point. It should, however, be observed that the use of the apparatus so far described does not supply any information whatsoever concerning the magnitude of the angle between the horizontal ground plane and the glide path along which the aircraft is flying.

When an aircraft is approaching a landing runway it is not sufficient that the nose of the aircraft paints all the time towards the touchdown area. Instead, one or more of further variables also must have predetermined values. Examples of such variables are the speed of the aircraft, its attitude and the glide path angle above referred to. The term "attitude" as used in this context refers to the angle in a vertical plane between the longitudinal axis of the aircraft and the path through the air along which the aircraft is flying. One or more of those variables may via servo-means 10 control the pivot angle of unit 7. The control is made in such a way that when the sum of the actual values of those variables agrees with a predetermined nominal value, means 10 makes the rotational angle between units 6 and 7 zero. As has been explained above, this means that the two light spots 6a and 7a are at the same level and the pilot is accordingly supplied with an unambiguous and manifest information about the fact that his aircraft is not only flying along a predetermined flight path but is also flying at the correct speed and with the desired attitude, etc. All the pilot has to do is constantly to keep light spot 6a in level with his line of sight to the touchdown point.

The last-mentioned situation has been illustrated in FIG. 4 where the remote object is constituted by the intended touchdown point of the aircraft at the one end of a runway 11.

FIG. 5 corresponds to FIG. 3, i.e. spot 7a is at a lower level than spot 6a. In practice this means that either the glide path angle to the touchdown point is too small, that the speed of the aircraft is too low, or both.

As far as the situation of the aircraft is concerned FIG. 6 corresponds exactly to FIG. 5. The only difference is that the head of the pilot is at a lower level. Due to this both light spots have been displaced downwards. It is, however, important to note that their mutual vertical distance has not been changed. Secondly, it should be noted that the direction information also remains constant, because the two light spots still have the same positions relatively the intended touchdown point on the runway.

FIG. 7 illustrates a case in which the deviations of the relevant parameters from the nominal values are greater than in FIG. 6. This means that the glide path angle is still less, that the speed is still lower, or both. This represents a risky situation and the pilot must be accordingly informed. He gets this information in the way that a signal lamp 12 at the lower end of unit 7 is lit up. The light intensity of the lamp may be constant or intermittent and of a suitable warning color, red or yellow. Correspondingly, there is at the upper end of disc 7 a signal lamp 13 energized in the opposite border line case.

As was mentioned above, the external illumination conditions are as a rule sufficient to create light spots 6a and 7a. When this is not so, an artificial light source may be used. As shown in FIG. 8 the end surface of one of the discs remote from the observer is partially covered by a light conductor, or optical fibre, 16 extending along the total height of unit 6 as appears from FIG. 3. As rod 16 covers only a portion of the width of the remote ends of light guides 2 daylight may enter the unit at the side of rod 16 when artificial illumination is not required. At the lower end of rod 16 there is a light source 17 in the shape of a miniaturized electrical bulb. The interface between rod 16 and the light guide unit should have such a structure that the light passes into the light guides. The remaining surfaces of rod 16 shall, in contrast thereto, be treated so as to reflect the light emitted by lamp 17 thereby improving the efficiency of the arrangement. A suitable way to achieve this is to provide those surfaces with silver coatings.

Reference numerals 14 and 15 designate plates or coatings covering the two opposite flat sides of each of disc-like units 6 and 7. As is understood, the object of those covers is to prevent lateral light penetration into light guides 2.

As the most important application of the invention probably involves replacing the head-up displays in aircraft referred to in the introduction of the specification the invention has here been described with reference to such an embodiment. It is, however, applicable also in several other fields, by way of example aboard ships. In such a case discs 6 and 7 are mounted with their flat sides in horizontal planes. The dimensions of the apparatus may then naturally be considerably greater than in aircraft. Also, several such apparatus may be arranged at different locations along the bridge of the ship, i.e. athwartships. With the aid of such an equipment the direction of the ship in relation to a remote object may be determined. For that purpose one rigidly mounted light guide disc is sufficient. If the equipment also includes a second, pivotable disc unit, the relative position of the light spot observed on that disc yields information about change of heading, helm shift or drift caused by winds or currents. If the apparatus is viewed from a great distance the observer will see a large light spot on each disc. If he uses one eye only, he will, as a matter of principle, perceive the same signal pattern as in the embodiment above described. If he looks at the apparatus from a short distance and uses both eyes, he will on each disc see two light spots the spacing of which corresponds to the distance between his eyes. On each unit comprising two discs he will therefore see two pairs of light spots and in each pair the horizontal spacing between the two spots is the same.

The practical working of the invention accomodates many variations not only as far as the field of use is concerned but also in terms of the structural nature of the apparatus. In some cases more than two disc units may be used. One of them is then stationary and the others individually pivotable, the pivoting movement of each disc unit being controlled by one or more variables. The end surfaces of the disc units facing the observer may be provided with color filters sensitive to mutually different colors. In this way the signal information obtained upon observation of the light spots is further amplified. The requirement for the eyes of the observer to be centered in relation to the end surfaces of the discs may be reduced by means of semi-circular cross-section rods mounted on those surfaces and operating as convex lenses.

What I claim is:

1. A device for indicating to an observer in a vehicle the deviation between the actual direction to a remote object and a predetermined reference direction, comprising first and second light transmitting units mounted on support means for angular movement of one relative to the other and in position for each of said units to present a separate visual display visible to the observer, each of said units having an input end facing the object and an output end facing the observer and including an array containing a plurality of elongated light guides which are optically insulated from one another and oriented with their longitudinal axes parallel to one another for passing substantially only plane-parallel light beams through said array, the input ends of said units being positioned to receive light from one or more natural or artificial sources, and the output ends of said units being positioned each to present a light spot visible to the observer, the units being angularly movable relative to each other around an axis perpendicular to the longitudinal axes of the light guides and to said input and output ends; the displacement of the one light spot relatively the other along the output ends indicating the magnitude of said direction deviation.

2. A device as claimed in claim 1, wherein said vehicle is an aircraft and said units are installed before a pilot's seat, said units being pivotable relative to each other in a plane parallel to a vertical plane through a longitudinal axis of said aircraft, and wherein said device includes means for pivoting said second unit in response to a control signal which is a function of a parameter including the air speed or the angle of attack of said aircraft's wings.

* * * * *